(12) United States Patent
Choi et al.

(10) Patent No.: US 8,000,700 B2
(45) Date of Patent: Aug. 16, 2011

(54) DEVICE DIAGNOSTICS AND MONITORING METHOD AND SYSTEM

(75) Inventors: Seung Chul Choi, Daegu Metropolitan (KR); Keun Soo Yang, Yongin-si (KR); Tae Seop Han, Gumi-si (KR)

(73) Assignee: Samsung Electronics Co., Ltd. (KR)

( * ) Notice: Subject to any disclaimer, the term of this patent is extended or adjusted under 35 U.S.C. 154(b) by 456 days.

(21) Appl. No.: 12/266,148

(22) Filed: Nov. 6, 2008

(65) Prior Publication Data
US 2009/0131040 A1    May 21, 2009

(30) Foreign Application Priority Data

Nov. 20, 2007   (KR) .................. 10-2007-0118491

(51) Int. Cl.
*H04Q 7/20*       (2006.01)
(52) U.S. Cl. .............. 455/425; 455/414.1; 340/5.54
(58) Field of Classification Search .............. None
See application file for complete search history.

(56) References Cited

U.S. PATENT DOCUMENTS

2006/0234698 A1* 10/2006 Fok et al. ............... 455/425
2007/0207800 A1*  9/2007 Daley et al. ............ 455/425
* cited by examiner

*Primary Examiner* — Phuoc Doan
(74) *Attorney, Agent, or Firm* — The Farrell Law Firm, P.C.

(57) ABSTRACT

A diagnostics and monitoring method and system is disclosed for generating diagnostics and monitoring information and transmitting the diagnostics and monitoring information to a remote terminal using an improved diagnostic and monitoring policy. The method includes selecting, at a remote terminal, one of available diagnostics and monitoring policies; transmitting a diagnostics and monitoring configuration information including at least one of a diagnostics and monitoring object, a memory allocation size, and a diagnostics and monitoring cycle from the remote terminal to a device management system; transmitting a diagnostics and monitoring message generated on the basis of the diagnostics and monitoring configuration information from the device management system to a mobile device; generating, at the mobile device, diagnostics and monitoring information with reference to the diagnostics and monitoring message; and transmitting the diagnostics and monitoring information.

12 Claims, 6 Drawing Sheets

DEVICE DIAGNOSTICS AND MONITORING METHOD AND SYSTEM

PRIORITY

This application claims priority under 35 U.S.C. §119(a) to a Korean application filed in the Korean Intellectual Property Office on Nov. 20, 2007 and assigned Serial No. 2007-0118491, the contents of which are incorporated herein by reference.

BACKGROUND OF THE INVENTION

1. Field of the Invention

The present invention relates to a mobile communication system and, in particular, to a device diagnostics and monitoring method and system that is capable of generating diagnostics and monitoring information and transmitting the diagnostics and monitoring information to a remote terminal using an improved diagnostic and monitoring policy.

2. Description of the Related Art

The Open Mobile Alliance Diagnostics and Monitoring (OMA DiagMon), which is a Diagnostics and Monitoring functionality standard for mobile devices, specifies how a remote terminal performs device management (DM) on DM objects and stores the diagnostics and monitoring results. In order to store the diagnostics and monitoring results, the user terminal assigns a predetermined size of memory for the mobile device including management objects. However, the conventional OMA DiagMon does not specify any policy for solving the problem of memory overflow error that occurs when the amount of data exceeds the memory capacity. Accordingly, when a memory overflow error occurs, the mobile device stops diagnosing and monitoring the management objects.

Since the conventional OMA DiagMon enables the mobile device to transmit the DM information collected before the occurrence of the memory overflow to the remote terminal, the remote terminal, functioning as a device manager, cannot acquire the most recent DM information even though the most recent DM information is probably more valuable than the old DM information.

SUMMARY OF THE INVENTION

The present invention has been made in an effort to solve the above problems, and the present invention provides a device diagnostics and monitoring method and system that provides various device management policies and enables selective execution of the device management policies adaptive to the operation status of the mobile device.

In accordance with a preferred embodiment of the present invention, a device diagnostics and monitoring method includes selecting, at a remote terminal, one of the available diagnostics and monitoring policies; transmitting diagnostics and monitoring configuration information indicating at least one of a diagnostics and monitoring object, a memory allocation size, and a diagnostics and monitoring cycle from the remote terminal to a device management system; transmitting a diagnostics and monitoring message generated on the basis of the diagnostics and monitoring configuration information from the device management system to a mobile device; generating, at the mobile device, diagnostics and monitoring information with reference to the diagnostics and monitoring message; and transmitting the diagnostics and monitoring information from the mobile device to the remote terminal according to the one of the available diagnostics and monitoring policies.

In accordance with another preferred embodiment of the present invention, a device diagnostics and monitoring system includes a remote terminal for generating diagnostics and monitoring configuration information including one of available diagnostics and monitoring policies, and at least one of a diagnostics and monitoring object, memory allocation size, and diagnostics and monitoring cycle, and transmitting the diagnostics and monitoring information; a device management system for generating a diagnostics and monitoring message containing the diagnostics and monitoring configuration information transmitted by the remote terminal; and a mobile device for generating and storing diagnostics and monitoring information on the basis of the diagnostics and monitoring message and processing the diagnostics and monitoring information with reference to the one of the available diagnostics and monitoring policies.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described with reference to the accompanying drawings in detail. The terms and phrases used in the specification and appended claims are provided to enable a clear and consistent understanding of the detailed description and the claims. Unless otherwise noted, the terms and phrases are to be understood according to conventional usage by those skilled in the relevant art. While the invention is shown and described with reference to certain preferred embodiments thereof, it will be understood by those skilled in the art that various changes in form and details may be made therein without departing from the spirit and scope of the invention as defined by the appended claims.

In the following, the device diagnostics and monitoring method and system is described in association with a mobile communication network including a Device Management System (DMS) performing a diagnostics and monitoring procedure on the management objects in the following description. The mobile communication network can be any of a $2^{nd}$ Generation (2G) communication system including Global System for Mobile Communication (GSM) and Code Division Multiple Access One (CDMAOne), 2.5 Generation (2.5G) communication system including General Packet Radio Service (GPRS), $3^{rd}$ Generation (3G) communication system including Wideband CDMA (WCDMA), CDMA2000, and beyond 3 G communication systems and the combinations thereof that support the DMS functionality.

In the following, the mobile device can be any type of mobile terminals operating with Time Division Multiple Access (TDMA), GSM, CDMA, WCDMA, and their equivalent communication protocols; Portable Multimedia Player (PMP), digital broadcast receiver, Personal Digital Assistant (PDA), Smartphone, and other types of information and multimedia-processing capable devices.

Figure 1:
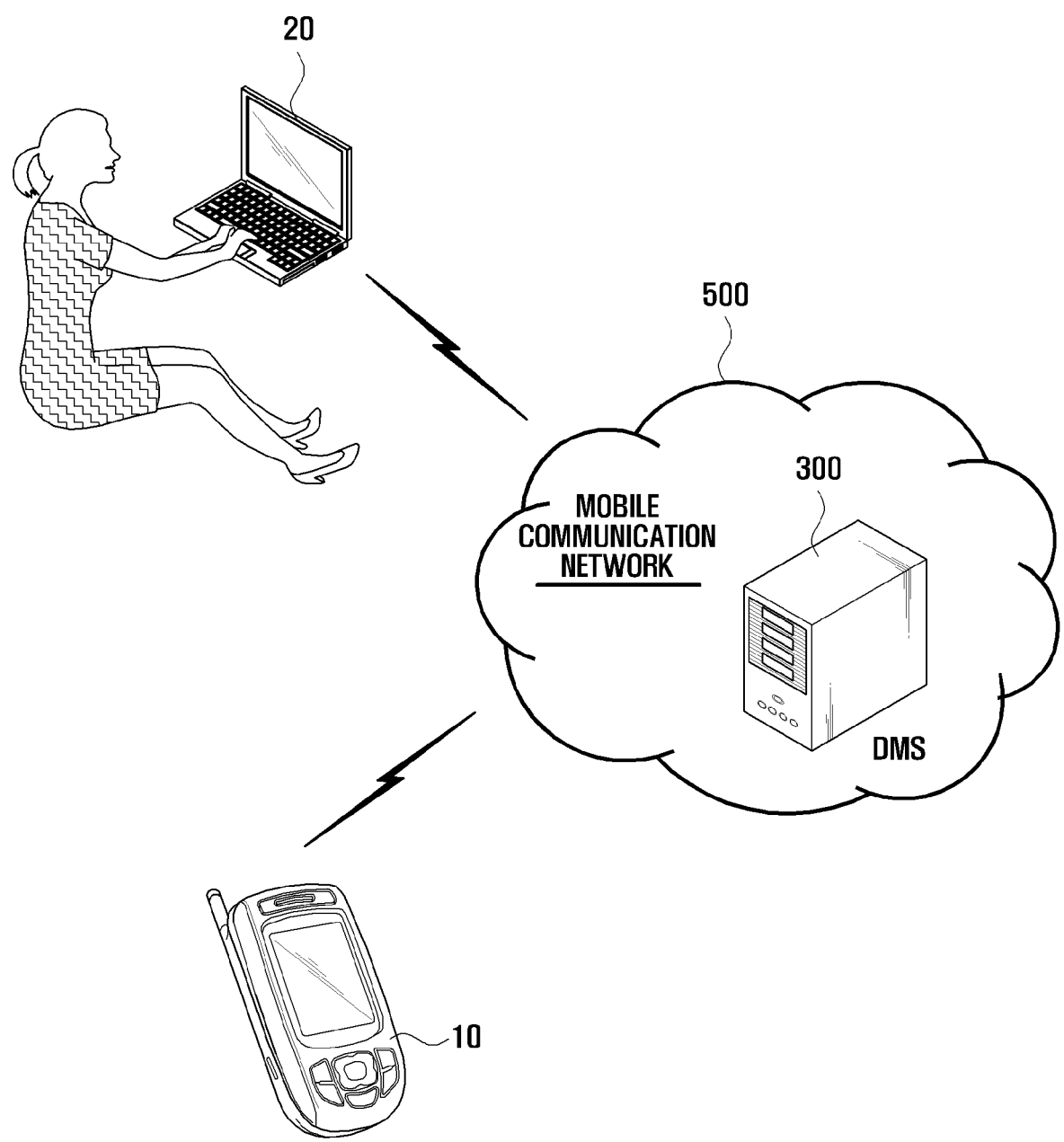
FIG. 1 is a schematic diagram illustrating a device diagnostics and monitoring system according to a preferred embodiment of the present invention.

FIG. 1 is a schematic diagram illustrating a device diagnostics and monitoring system according to a preferred embodiment of the present invention.

Referring to FIG. 1, the device diagnostics and monitoring system includes a mobile device 10 having device management (DM) objects; a remote terminal 20 for selecting one of the DM objects and configuring diagnostics and monitoring cycle (DM cycle), memory size assignment, and DM policies; and a mobile communication network 500 including a DMS 300 for performing the DM function on the DM objects.

The DM objects can be classified into device specification objects and device performance objects.

The device specification objects are objects related to the specification of the mobile device, e.g. a firmware version object, hardware objects (such as Central Processing Unit (CPU), Liquid Crystal Display (LCD), and memory), a network interface object, an Operating System (OS) object, and a battery object.

The device performance objects are objects related to the performance of the mobile device 10, e.g. processor objects (such as processor memory, CPU utilization, operation status of processor), a battery usage and status monitoring object, and an LCD status object.

The mobile communication network 500 may include the network equipments such as base stations, base station controllers for controlling the base station, a mobile switching center for controlling the base station controllers and allocating resources, an accounting server, and other servers for supporting various communication services.

The remote terminal 20 first selects a DM object and one of the DM policies associated with the DM object and reports the selected DM policy to the DMS 300. Next, the DMS 300 checks Electronic Serial Numbers (ESNs) of the mobile devices associated with the mobile communication network 500. The DMS 300 then selects the mobile device 10 having the DM object and transmits a DM message to the mobile device 10. Upon receiving the DM message, the mobile device 10 performs diagnostics and monitoring on the DM object and generates and stores DM information. Here, if memory overflow occurs, the mobile device 10 processes the DM information according to a predetermined DM policy. In this manner, the mobile device 10 can diagnose and monitor the DM object periodically and process the DM information according to the predetermined DM policy when the memory overflow is detected. The structure of the DMS 300 will be described in detail hereinafter.

Figure 2A:
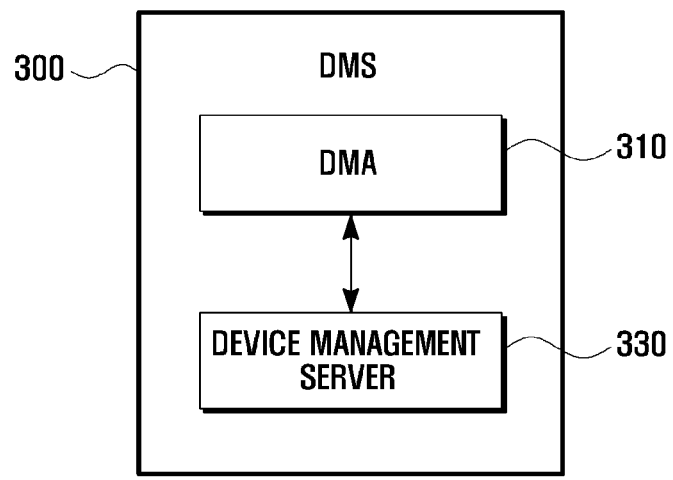
FIG. 2A is a block diagram illustrating a configuration of the Device Management System (DMS) of FIG. 1.
Figure 2B:
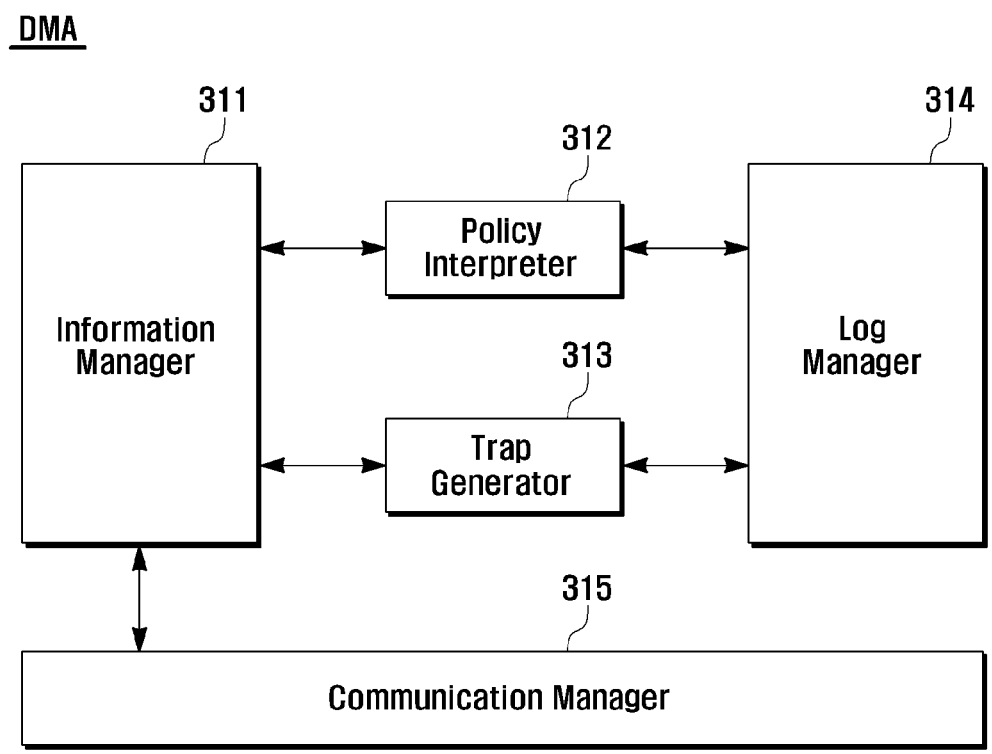
FIG. 2B is a block diagram illustrating a configuration of a Diagnostics and Monitoring Agent (DMA) of FIG. 2A.
Figure 2C:
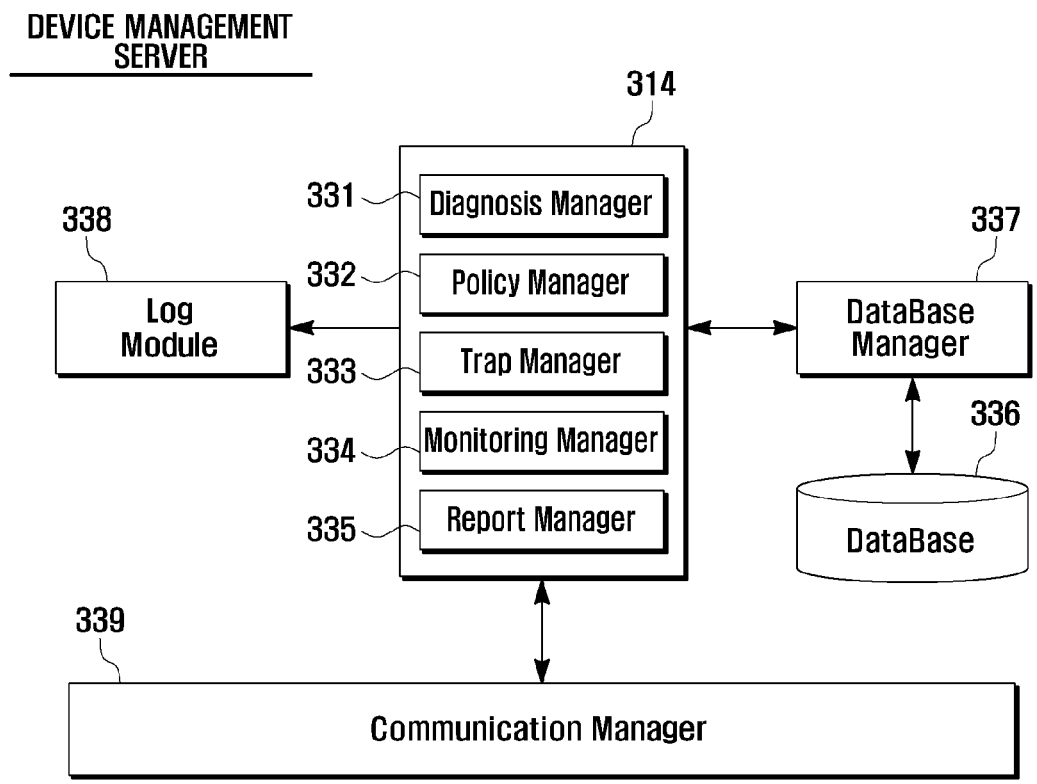
FIG. 2C is a diagram illustrating a device management server of FIG. 2A.

FIG. 2A is a block diagram illustrating a configuration of the DMS of FIG. 1. FIG. 2B is a block diagram illustrating a configuration of a DMA of FIG. 2A. And FIG. 2C is a diagram illustrating a device management server of FIG. 2A.

Referring to FIG. 2A, the DMS 300 includes a Diagnostics and Monitoring Agent (DMA) 310 and a device management server 330.

The DMA 310 collects the DM information created by the mobile device 10 and transfers the DM information to the device management server 330. The device management server 330 stores the MD information received from the DMA 310 and provides a user with the DM information in response to a user request. The structures of the DMA 310 and the device management server 330 are described hereinafter in more detail.

Referring to FIG. 2B, the DMA 310 includes an information manager 311 for managing the memory allocation size, DM policy, and DM cycle of the mobile device 10; a policy interpreter 312 for analyzing the DM policy managed by the information manager 311; a trap generator 313 for generating a trap event when a problem is detected while monitoring the memory of the mobile device 10; a log manager 314 for recording and processing logs to each module, and a communication manager 315 responsible for the communication with the device management server 330. Particularly in this embodiment, the DMA 310 transmits the DM information request message received from the remote terminal 20 to the mobile device 10 and receives the DM information response message from the mobile device 10 in response to the DM information request message.

Referring to FIG. 2C, the device management server 330 includes a diagnosis manager 331 for detecting a signal received from the remote terminal 20 and establishing, executing, and managing the diagnosis procedure; a policy manager 332 for executing and managing the policies associated with the mobile device including the diagnostics and management policy; a trap manager 333 for processing the trap event received from the DMA 310; a monitoring manager 334 for periodically monitoring the device performance of the mobile device 10, particularly, the memory state; a report manager 335 for reporting the trap event and diagnosis and monitoring results in the form of Electronic Mail, Short Messaging Service (SMS), or Multimedia Messaging Service (MMS); a database (DB) 336 for storing the log and DM information generated by the mobile device 10; a DB manager 337 for managing the DB 336, a log manager 338 for recording and processing logs to each module, e.g. the trap events and diagnostics and monitoring results; and a communication module 339 responsible for communication.

The device management server 330 can select a policy for diagnosing and monitoring a memory unit of the mobile device 10 according to the DM object of the mobile device.

Figure 3:
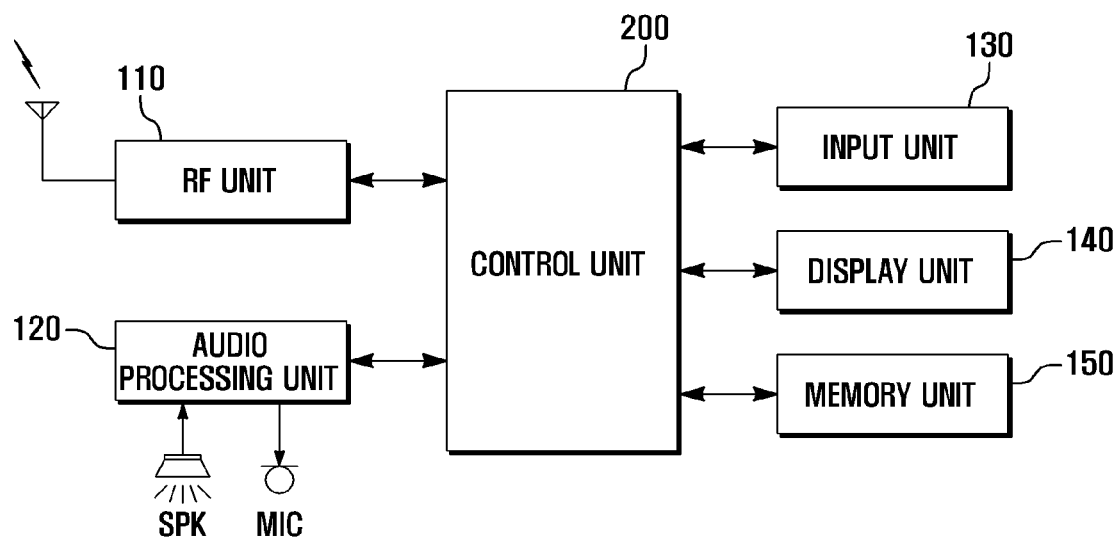
FIG. 3 is a block diagram illustrating a configuration of the mobile device of FIG. 1.

FIG. 3 is a block diagram illustrating a configuration of the mobile device of FIG. 1.

Referring to FIG. 3, the mobile device includes a radio frequency (RF) unit 110, an audio processing unit 120, an input unit 130, a display unit 140, a memory unit 150, and a control unit 200.

The RF unit 110 is responsible for radio communication with other mobile devices for exchanging user information such as message and voice. The RF unit 110 includes an RF transmitter for up-converting and amplifying the transmission signal and an RF receiver for low-noise amplifying and down-converting the received signal. The RF unit 110 converts the modulated signal received from the control unit 200 first to an intermediate frequency signal and then high frequency signal to be transmitted to a base station through an antenna (ANT). Also, the RF unit 110 converts the high frequency signal received from the base station first to an intermediate frequency signal and then baseband signal to be delivered to the control unit 200. Particularly in this embodiment, the RF unit 110 receives the DM message from the DMS 300 and transmits a replay to the DMS 330 in response to the DM message.

The audio processing unit 120 processes the audio data received from the control unit 220 and outputs the processed audio signal through a speaker (SPK) in the form of audible sound wave and processes the audio signal including voice input through the microphone (MIC) and outputs the processed audio data to the control unit 200. That is, the audio processing unit 120 converts the analog voice signal input through the microphone (MIC) to the digital signal and output the digital signal to the control unit 200, and converts the digital signal input by the control unit 200 to the audible analog signal and outputs the analog signal through the speaker (SPK). Particularly in this embodiment, when the mobile device 10 receives the DM information request message from the DMS 300, the audio processing unit 120 can be configured to output an alarm sound for alerting the reception of the DM information request message through the speaker (SPK).

The input unit 130 is provided with a plurality of alphanumeric keys for receiving alphanumeric data and a plurality of function keys for executing various functions of the mobile device 10. The function keys can be implemented in the form of navigation keys, side keys, and shortcut keys. The input unit 130 transmits the key signals generated in response to the keys input for configuration and function control of the mobile device 10 to the control unit 200.

The display unit 140 displays menu screens of the mobile device 10, user information input by the user, function configuration information, and other user data. The display unit 140 can be implemented with a Liquid Crystal Display (LCD). In this case, the display unit 140 is provided with a controller for controlling the LCD, a video memory for storing video data, and LCD devices. In a case that the LCD supports touch screen function, the display unit 40 acts as a part of the input unit 130. Particularly in this embodiment, the display unit 140 is configured to display the DM message and DM information request message received from the DMS 300.

The memory unit stores the operating system of the mobile device 10 and application programs required for executing various functions of the mobile device 10. The memory unit 150 stores the DM information generated as a result of the diagnostics and monitoring on the DM object. The memory unit 150 can be divided into a program area and a data area.

The program area stores the operating system (OS) for booting the mobile device 10, application programs for supporting the diagnostics and monitoring service, and other application programs for executing optional multimedia functions of the mobile device 10 such as audio and video playback. Particularly in this embodiment, the program area stores programs for selecting the DM object randomly, diagnosing and monitoring the DM object, executing the DM function, and generating the DM information as the result of the execution of the DM function.

The data area stores the data generated while operating the mobile device 10. The data includes status information of the mobile terminal, DM information generated as the result of the device diagnosis and monitoring, and communication data received from other terminals. The data area also stores the user data associated with the functions of the mobile device such as phonebook data, audio data, downloaded contents, and optional settings. Particularly in this embodiment, the data area stores the DM object selection information, DM cycle information, memory allocation size, and DM information generated as a result of execution of DM function.

The control unit 200 controls generation operations and signaling among the internal components of the mobile device 10. That is, the control unit 200 controls the cooperative signaling among the RF unit 110, the audio processing unit 120, the input unit 130, the display unit 140, and the memory unit 150.

The control unit 200 also controls the functions of the mobile device 10 in response to the user command input through the input unit 130 and displays the operation status of the mobile device and indicative information including various menus.

Particularly in this embodiment, the control unit 200 analyzes the DM message received from the DMS 300 and checks the DM object as a result of the analysis. The control unit 200 determines the DM cycle, memory allocation size, and DM policy on the basis of the analysis result. Next, the control unit 200 performs the diagnostics and monitoring procedure on the DM object and generates and stores the DM information. If the DM information request message is received, the control unit 200 collects the DM information, generates the DM information message with the collected DM information, and then transmits the DM information message to the DMS 300.

Figure 4:
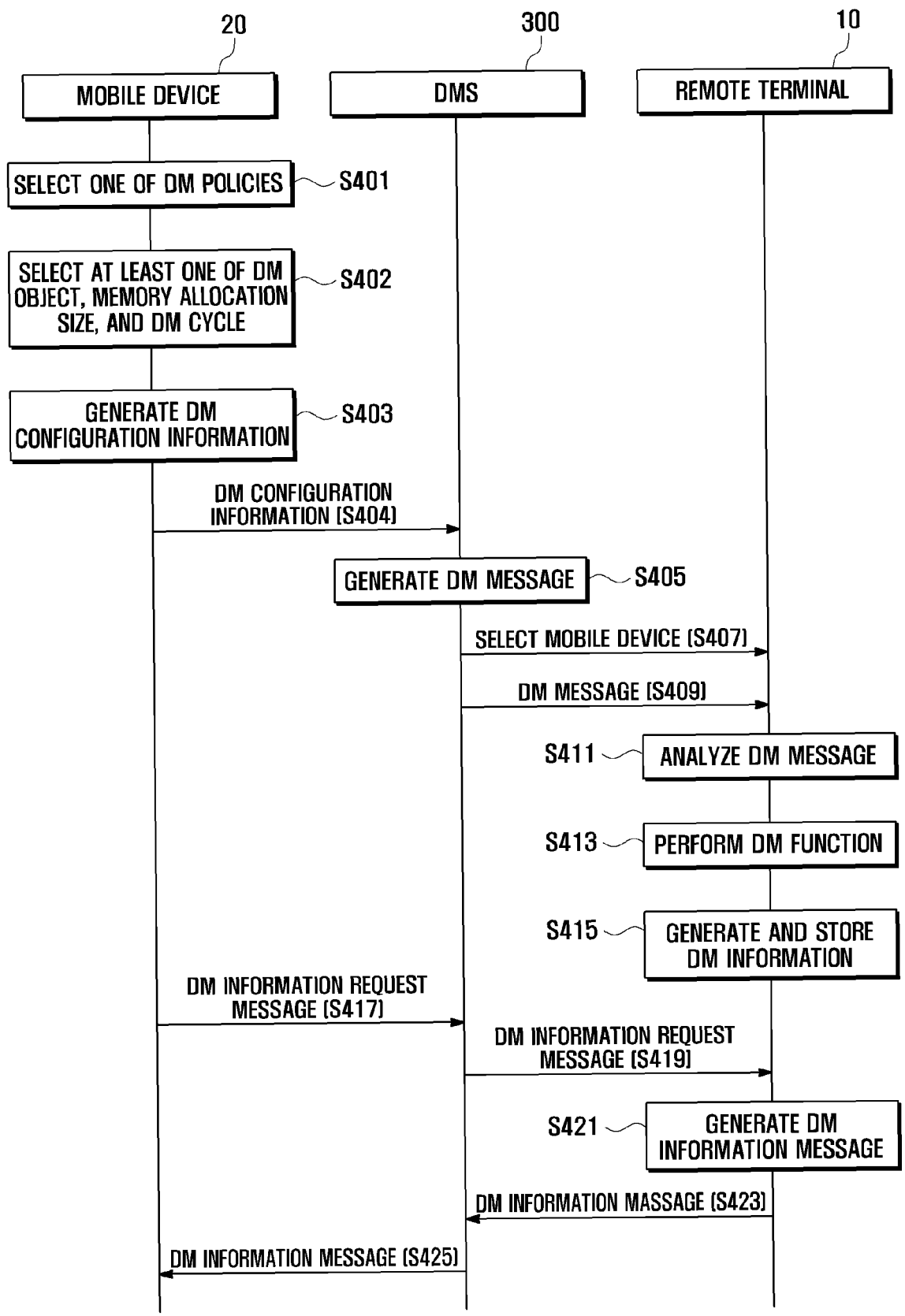
FIG. 4 is a message flow diagram illustrating a device diagnostics and monitoring method according to a preferred embodiment of the present invention.

FIG. 4 is a message flow diagram illustrating a device diagnostics and monitoring method according to a preferred embodiment of the present invention.

Referring to FIG. 4, the remote terminal 20 selects one of the DM policies required for diagnosing and monitoring the DM objects in step S401. The DM policy can be configured in various manners according to the user's intention. In this embodiment, the DM policies are introduced in the titles of a first policy and a second DM policy for simplifying the explanation. However, various policies can be used according to the types of the DM object. For example, a third DM policy can be added for transmitting the DM information to the DMS 300 to initialize the memory unit 150 when the memory overflow occurs. The third DM policy stores the most recently generated DM information in the memory unit 150 and transmits the DM information to the DMS 300 in response to the DM information request message transmitted by the DMS 300.

The first and the second DM policies can be specified as following.

The first DM policy stops the DM function if the memory overflow is detected. Afterward, if a DM information request message is received from the DMS 300, the mobile device 10 collects the first DM information stored in the memory unit 150 and transmits the first DM information to the DMS 300. In the case of using the first DM policy, the remote terminal 20 is preferably requesting and checking the first DM information stored in the memory unit 150 frequently in order to prevent the occurrence of the memory overflow.

The second DM policy removes the oldest DM information stored in the memory unit 150 and stores the most recently generated DM information when the memory overflow occurs. Afterward, if a DM information request message is received from the DMS 300, the mobile device 10 collects the second DM information stored in the memory unit 150 and transmits the second DM information to the DMS 300.

After selecting the DM policy, the remote terminal 20 selects at least one of a diagnostics and monitoring object, a memory allocation size, and a diagnostics and monitoring cycle in step S402. Next, the remote terminal 20 generates DM configuration information containing the parameters selected at steps S401 and S402 in step S403 and transmits the DM configuration information to the DMS 300 in step S404. That is, the DM configuration information includes the selected diagnostic and monitoring policy and at least one of the diagnostics and monitoring object, memory allocation size, and diagnostics and monitoring cycle.

The DM configuration information may include at least one of the selected DM object, DM policy, DM cycle, and memory allocation size. Upon receiving the DM configuration information, the DMS 300 generates a DM message on the basis of the DM configuration information in step S405. At this time, the DM message can be composed in the form of a short message or multimedia message. Next, the DMS 300 scans the ESNs of the mobile devices discovered in the mobile communication network for finding the mobile device. As a result of the scanning, the DMS 300 selects the mobile device 10 having the DM object in step S407 and delivers the DM message to the mobile device 10 in step S409.

Upon receiving the DM message, the mobile device 10 analyzes the DM message in step S411. Through the DM message analysis, the mobile device 10 checks the DM object, the DM cycle, the memory allocation size, and the DM policy. If a memory overflow is detected after performing the DM message analysis, the mobile device 10 refers to the DM policy indicated by the DM message.

Sequentially, the mobile device 10 performs the diagnostics and monitoring procedure on the DM object in step S413 with reference to the DM cycle, the memory allocation size, and the DM policy acquired through DM message analysis in step S413. After performing the DM function, the mobile device 10 generates and stores the DM information in the memory unit 150 in step S415. The mobile device 10 generates and stores the DM information periodically on the basis of the DM cycle. Meanwhile, if the remote terminal 20 transmits a DM information request message to the DMS 300 in step S417, the DMS 300 forwards the DM information request message to the mobile device 10 in step S418. Upon receiving the DM information request message, the mobile device 10 generates a DM information message with the DM information stored in the memory unit in step S421 and transmits the DM information message to the DMS 300 in step S423. Consequently, the DMS 300 forwards the DM information message to the remote terminal in step S425 and the diagnostics and monitoring procedure is successfully done as the remote terminal 20 receives the DM information message.

Figure 5A:
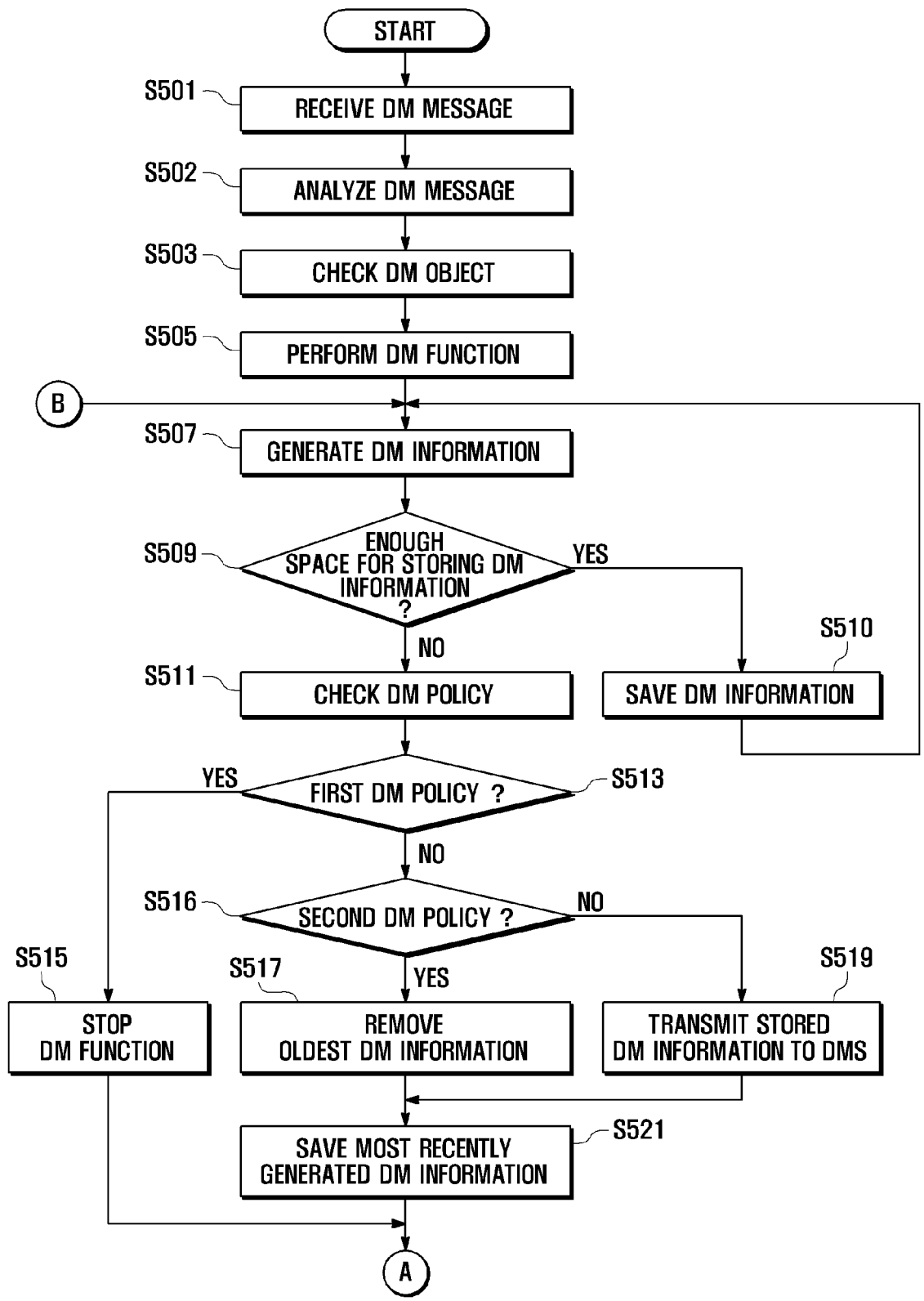
FIGS. 5A-5B are flowcharts illustrating a device diagnostics and monitoring method according to another preferred embodiment of the present invention.
Figure 5B:
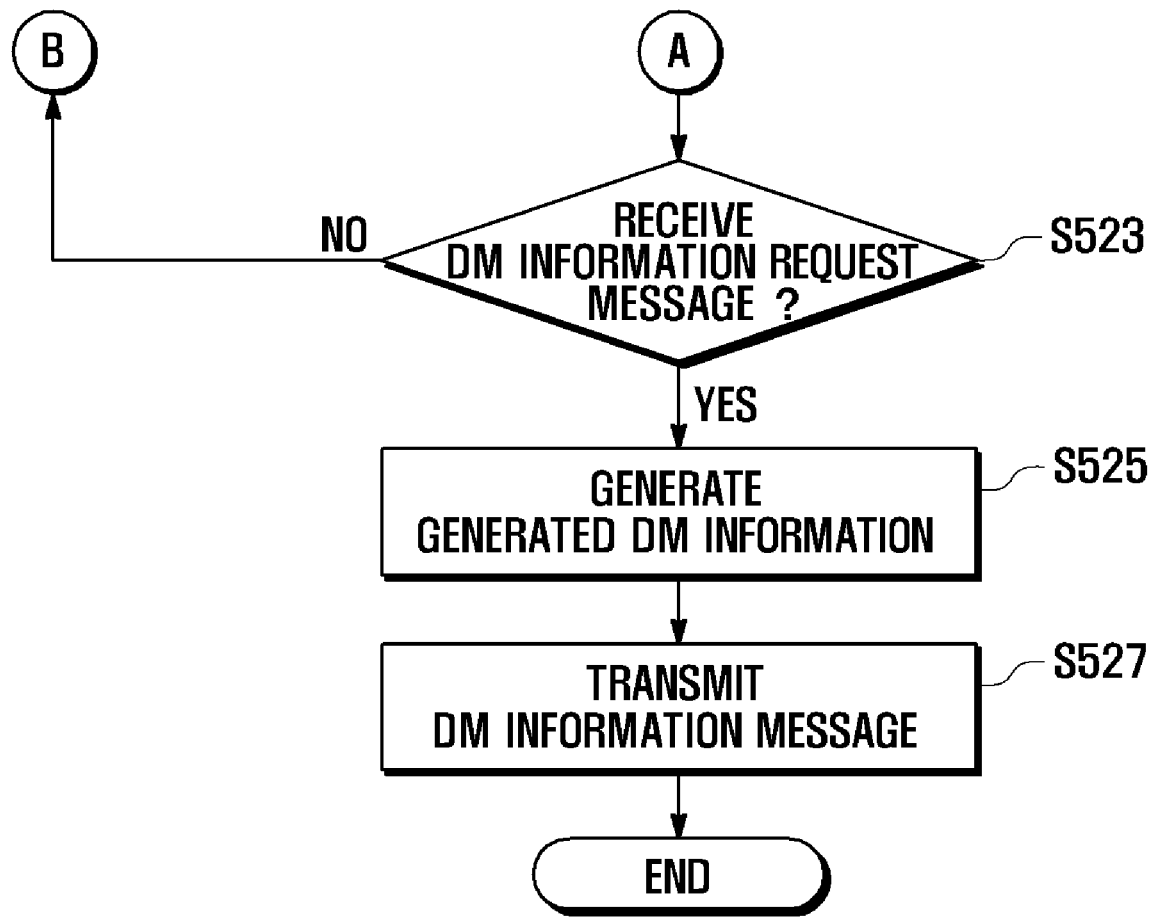

FIG. 5 is a flowchart illustrating a device diagnostics and monitoring method according to another preferred embodiment of the present invention.

Referring to FIG. 5, the control unit 200 of the mobile terminal 10 receives a DM message from the DMS 300 in step S501 and analyzes the DM message in step S502. As a result of the DM message analysis, the control unit 200 recognizes the DM object, the DM cycle, the memory allocation size, and the DM policy indicated the DM message in step S503. Next, the control unit 200 performs the DM function on the DM object in step S505 and generates the DM information in step S507. Sequentially, the control unit 200 determines whether the memory unit 150 has enough space for storing the DM information in step S509. If the memory unit 150 has enough space, the control unit 200 saves the DM information in the memory unit 150 and repeats step S507 for updating the DM information. On the other hand, if there is not enough space for storing DM information, the control unit 200 refers to the DM policy in step S511 and processes the DM information according to the DM policy. That is, the control unit 200 determines whether the DM policy is the first DM policy in step S513. If it is determined that that DM policy is the first DM policy, the control unit 200 stops the DM function on the DM object in step S515. On the other hand, if the DM policy is not the first DM policy, the control unit 200 determines whether the DM policy is the second DM policy in step S516. If the DM policy is the second DM policy, the control unit 200 removes the oldest DM information from the memory unit 150 in step S517 and stores the currently generated DM information in the memory unit 150 in step S521. If the DM policy is not the second DM policy either, the control unit 200 transmits the DM information stored in the memory unit 150 and initialize the memory unit 150 in step S519 and then stores the currently generated DM information in the memory unit 150 in step S521. After processing the DM information according to the DM policy, the control unit 200 determines whether a DM information request message is received in step S523. If no DM information request message is received, the control unit 200 repeats step S507 for generating new DM information. In contrast, if a DM information request message is received, the control unit 200 generates a DM information message with the DM information stored within the memory unit 150 in step S525 and transmits the DM information message to the DMS 300 in step S527.

As described above, the device diagnostics and monitoring method of the present invention allows a remote terminal to perform diagnostics and monitoring on a device management object using one of available diagnostics and monitoring policies, thereby solving the diagnostics and monitoring failure problem caused by memory overflow in a target mobile device, resulting in diagnostics and monitoring reliability.

Although preferred embodiments of the present invention have been described in detail hereinabove, it should be clearly understood that many variations and/or modifications of the basic inventive concepts herein taught which may appear to those skilled in the art will still fall within the spirit and scope of the present invention, as defined in the appended claims.

What is claimed is:

1. A device diagnostics and monitoring method comprising:
   selecting, at a remote terminal, one of available diagnostics and monitoring policies;
   transmitting diagnostics and monitoring configuration information including at least one of a diagnostics and monitoring object, a memory allocation size, and a diagnostics and monitoring cycle from the remote terminal to a device management system;
   transmitting a diagnostics and monitoring message generated on the basis of the diagnostics and monitoring configuration information from the device management system to a mobile device;
   generating, at the mobile device, diagnostics and monitoring information with reference to the diagnostics and monitoring message; and
   transmitting the diagnostics and monitoring information from the mobile device to the remote terminal according to the available diagnostics and monitoring policy.

2. The device diagnostics and monitoring method of claim 1, wherein the available diagnostics and monitoring policies comprises:
   a first diagnostics and monitoring policy for stopping diagnosing and monitoring when an event is detected;
   a second diagnostics and monitoring policy for removing oldest diagnostics and monitoring information and saving currently generated diagnostics and monitoring information when the event is detected; and
   a third diagnostics and monitoring policy for transmitting the diagnostics and monitoring information to the device management system and storing the currently generated diagnostics and monitoring information.

3. The device diagnostics and monitoring method of claim 1, wherein the diagnostics and monitoring object is at least one of device specification objects including objects associated with specification of the mobile device and one of device performance objects including objects associated with performance of the mobile device.

4. The device diagnostics and monitoring method of claim 1, wherein generating diagnostics and monitoring information comprises:
checking the diagnostics and monitoring object; and
diagnosing and monitoring the diagnostics and monitoring object.

5. The device diagnostics and monitoring method of claim 1, wherein generating diagnostics and monitoring information comprises:
checking remaining space of a memory with reference to the memory allocation size; and
storing, when the remaining space is sufficient in size, the diagnostics and monitoring information.

6. The device diagnostics and monitoring method of claim 1, wherein transmitting the diagnostics and monitoring information comprises:
receiving a diagnostics and monitoring information request message from the device management system containing the diagnostics and monitoring information;
generating the diagnostics and monitoring information message with the stored diagnostics and monitoring information;
transmitting the diagnostics and monitoring information message to the device management system.

7. A device diagnostics and monitoring system comprising:
a remote terminal for generating diagnostics and monitoring configuration information including one of available diagnostics and monitoring policies, and at least one of a diagnostics and monitoring object, a memory allocation size, and a diagnostics and monitoring cycle, and transmitting the diagnostics and monitoring information;
a device management system for generating a diagnostics and monitoring message containing the diagnostics and monitoring configuration information transmitted by the remote terminal; and
a mobile device for generating and storing diagnostics and monitoring information on the basis of the diagnostics and monitoring message and processing the diagnostics and monitoring information with reference to the available diagnostics and monitoring policy.

8. The device diagnostics and monitoring system of claim 7, wherein the diagnostics and monitoring policies comprises:
a first diagnostics and monitoring policy for stopping diagnosing and monitoring when an event is detected;
a second diagnostics and monitoring policy for removing oldest diagnostics and monitoring information and saving currently generated diagnostics and monitoring information when the event is detected; and
a third diagnostics and monitoring policy for transmitting the diagnostics and monitoring information to the device management system and storing the currently generated diagnostics and monitoring information.

9. The device diagnostics and monitoring system of claim 7, wherein the diagnostics and monitoring object is at least one of device specification objects including objects associated with specification of the mobile device and one of device performance objects including objects associated with performance of the mobile device.

10. The device diagnostics and monitoring system of claim 7, wherein the mobile device checks out the diagnostics and monitoring object and performs diagnostics and monitoring on the diagnostics and monitoring object.

11. The device diagnostics and monitoring system of claim 7, wherein the mobile device determines remaining space of a memory with reference to the memory allocation size and stores, when the remaining space is sufficient in size, the diagnostics and monitoring information.

12. The device diagnostics and monitoring system of claim 7, wherein the mobile device receives a diagnostics and monitoring information request message from the device management system, generates the diagnostics and monitoring information message with the stored diagnostics and monitoring information, transmits the diagnostics and monitoring information message to the device management system.

* * * * *